United States Patent
Copeland et al.

(10) Patent No.: US 10,275,777 B2
(45) Date of Patent: Apr. 30, 2019

(54) CENTRALIZED COMPLIANCE ASSESSMENT TOOL

(71) Applicant: Bank of America Corporation, Charlotte, NC (US)

(72) Inventors: Anthony Edward Copeland, Charlotte, NC (US); Eileen Marie Daly, IV, Arlington Heights, IL (US); Charlene W. Cook, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/704,806

(22) Filed: Sep. 14, 2017

(65) Prior Publication Data

US 2019/0080334 A1    Mar. 14, 2019

(51) Int. Cl.
  *G06F 9/44*   (2018.01)
  *G06Q 30/00*   (2012.01)
  *G06F 17/30*   (2006.01)

(52) U.S. Cl.
  CPC ..... *G06Q 30/018* (2013.01); *G06F 17/30979* (2013.01)

(58) Field of Classification Search
  CPC .................................................. G06Q 30/018
  See application file for complete search history.

(56) References Cited

U.S. PATENT DOCUMENTS

| | | |
|---|---|---|
| 6,912,502 B1 | 6/2005 | Buddle et al. |
| 7,280,976 B2 | 10/2007 | Litwiller et al. |
| 7,448,023 B2 | 11/2008 | Chory et al. |
| 8,028,269 B2 | 9/2011 | Bhatia et al. |
| 9,507,960 B2 | 11/2016 | Bell et al. |
| 9,563,422 B2 | 2/2017 | Cragun et al. |
| 9,729,583 B1 | 8/2017 | Barday |
| 9,778,930 B2 | 10/2017 | Dimitrakos et al. |
| 9,794,297 B1 | 10/2017 | Hamilton, II et al. |
| 9,807,116 B2 | 10/2017 | Frascadore et al. |
| 9,813,450 B1 | 11/2017 | Wasiq et al. |

(Continued)

FOREIGN PATENT DOCUMENTS

| | | |
|---|---|---|
| EP | 2816469 A1 | 12/2014 |
| EP | 2816470 A1 | 12/2014 |

(Continued)

*Primary Examiner* — Hang Pan
(74) *Attorney, Agent, or Firm* — Michael A. Springs; Moore & Van Allen PLLC; Anup Shrinivasan (57) ABSTRACT

Systems, computer program products, and methods are described herein for a centralized compliance assessment tool. The present invention is configured to deploy a compliance assessment application to be executed in parallel on one or more applications; initiate one or more retrieval scripts configured to cause the one or more applications to generate one or more digital artifacts to indicate a compliance of the one or more applications to one or more regulatory requirements; determine that the one or more applications are compliant with the one or more regulatory requirements based on at least the one or more digital artifacts generated; and initiate an execution of a regulatory report script based on at least determining that the one or more applications are compliant with the one or more regulatory requirement.

20 Claims, 3 Drawing Sheets

(56) References Cited

U.S. PATENT DOCUMENTS

| | | |
|---|---|---|
| 2002/0120642 A1 | 8/2002 | Fetherston |
| 2004/0236880 A1* | 11/2004 | Barrett ............... G06F 11/0745 710/52 |
| 2007/0226721 A1* | 9/2007 | Laight ................... G06Q 10/06 717/154 |
| 2007/0261099 A1* | 11/2007 | Broussard ............ H04L 63/102 726/1 |
| 2007/0266420 A1 | 11/2007 | Hawkins et al. |
| 2010/0023353 A1 | 1/2010 | Stoffiere |
| 2012/0167197 A1* | 6/2012 | Kruger ................... G06F 12/00 726/16 |
| 2014/0325035 A1* | 10/2014 | Ding .................... H04L 41/082 709/220 |
| 2015/0135168 A1* | 5/2015 | Padmanabhan ....... G06F 11/368 717/131 |
| 2016/0140209 A1 | 5/2016 | Dimitrakos et al. |

FOREIGN PATENT DOCUMENTS

| | | |
|---|---|---|
| EP | 2816471 A1 | 12/2014 |
| EP | 2816472 A1 | 12/2014 |
| WO | 2014202934 A1 | 12/2014 |

\* cited by examiner

CENTRALIZED COMPLIANCE ASSESSMENT TOOL

FIELD OF THE INVENTION

The present invention embraces a system for a centralized compliance assessment tool for regulatory reporting.

BACKGROUND

Entities face increasing legal and regulatory challenges and requirements to demonstrate their compliance in a technology environment. This is typically achieved by creating policies and controls for each regulatory policy and/or standard that will inspect and prove adherence. To this extent, entities typically access a portfolio of applications associated with each regulatory policy and/or standard and analyze each of them individually for a comprehensive assessment.

There is a need for an entity-wide assessment tool capable of centralized management of such applications for compliance adherence and regulatory reporting.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for centralized compliance assessment is presented. The system comprising: at least one non-transitory memory device with computer-readable code stored thereon; at least one processing device; and at least one module stored in said memory device and comprising instruction code that is executable by the at least one processing device and configured to cause said at least one processing device to: deploy, via a network of distributed servers, a compliance assessment application, wherein the compliance assessment application is executed, in parallel, on one or more applications, wherein the one or more applications are in an active state; initiate, via the compliance assessment application, one or more retrieval scripts configured to cause the one or more applications to generate one or more digital artifacts; determine that the one or more applications are compliant with one or more regulatory controls based on at least the one or more digital artifacts generated; and initiate an execution of a regulatory report script based on at least determining that the one or more applications are compliant with the one or more regulatory controls, wherein the regulatory report script is configured to generate a graphical interface comprising the one or more digital artifacts, the one or more applications, and an indication of compliance of each of the one or more applications.

In some embodiments, the module is further configured to: initiate, via a network of distributed servers, an application detection script configured to identify one or more applications that require compliance with one or more regulatory requirements.

In some embodiments, the module is further configured to: determine that at least one of the one or more applications is currently not in an active state; transmit control signals configured to cause the at least one of the one or more applications to be activated, wherein activating further comprises initiating the at least one of the one or more applications to run in the background; and deploy the compliance assessment application, wherein the compliance assessment application is executed, in parallel, on the at least one of the one or more applications in the background, and the one or more applications in an active state.

In some embodiments, the module is further configured to: determine one or more regulatory controls associated with one or more regulatory requirements, wherein the one or more regulatory controls indicate a level of compliance of the one or more applications to the one or more regulatory requirements; and map the one or more retrieval scripts to the one or more regulatory controls, wherein mapping further comprises mapping the one or more digital artifacts generated in response to the one or more retrieval scripts with the one or more regulatory controls.

In some embodiments, the module is further configured to: receive the one or more digital artifacts generated in response to initiating the one or more retrieval scripts; determine that the one or more digital artifacts satisfy the one or more regulatory controls based on at least mapping the one or more digital artifacts generated in response to the one or more retrieval scripts with the one or more regulatory controls; determine that the one or more applications are compliant with the one or more regulatory requirements based on at least the one or more digital artifacts satisfying the one or more regulatory controls.

In some embodiments, the module is further configured to: execute the compliance assessment application on the one or more applications at one or more periodic intervals to determine whether the one or more applications continue to meet one or more regulatory requirements.

In some embodiments, the module is further configured to: retrieve a first periodic interval and a second periodic interval from an assessment engine, wherein the first periodic interval is associated with a first application, and the second periodic interval is associated with a second application; execute the compliance assessment application on the first application and the second application at a first time instant, wherein the first time instant indicates an initial point associated with a first period of the first periodic interval and a first period of the second periodic interval; generate a first version of a first digital artifact associated with the first application and a second version of a second digital artifact associated with the second application; determine that the first periodic interval is shorter than the second periodic interval; execute the compliance assessment application on the first application and the second application at a second time instant, wherein the second time instant indicates an initial point associated with a second period of the first periodic interval but is a point still within the first period of the second periodic interval; and generate a second version of the first digital artifact associated with the first application and retrieve the first version of the second digital artifact associated with the second application.

In some embodiments, the module is further configured to: store the one or more digital artifacts generated in response to the one or more retrieval scripts in a volatile memory associated with the at least one memory device; retrieve the one or more digital artifacts from the volatile memory to determine whether the one or more digital artifacts satisfy the one or more regulatory controls, wherein determining further comprises comparing a digital artifact requirement associated with each of the one or more regulatory controls with the one or more digital artifacts retrieved.

In some embodiments, the module is further configured to: restrict access to the one or more digital artifacts stored in the volatile memory until the compliance assessment application has been executed on each of the one or more applications, and each of the one or more applications have generated the one or more digital artifacts.

In some embodiments, the module is further configured to initiate the one or more retrieval scripts, wherein initiating further comprises executing one or more functions of the one or more applications for a predetermined period of time.

In some embodiments, the module is further configured to generate one or more digital artifacts in response to the executing of the one or more functions of the one or more applications.

In some embodiments, the module is further configured to: determine that at least one of the one or more digital artifacts indicates that the one or more applications do not satisfy a required level of compliance to one or more regulatory requirements; and initiate an execution of the regulatory report script based on at least determining that the one or more applications do not comply with the one or more regulatory requirement, wherein the regulatory report script is configured to generate a graphical interface comprising the one or more digital artifacts, the one or more applications, and an indication of non-compliance of each of the one or more applications that do not comply with the one or more regulatory requirements.

In some embodiments, the module is further configured to trigger a non-compliance alert on a computing device associated with a user based on at least the indication of the non-compliance of each of the one or more applications, wherein the non-compliance alert comprises information associated with each of the one or more applications that do not comply with the one or more regulatory requirements and one or more user actions for corrective measure, wherein the triggering is configured to cause the computing device to transfer control signals to one or more output devices associated with the computing device.

In some embodiments, the one or more output devices are embedded in the computing device.

In some embodiments, the one or more output devices are wirelessly connected to the computing device, wherein the triggering of the non-compliance alert causes the computing device to establish a wireless communication link with the one or more output devices, thereby causing the one or more output devices to be activated.

In some embodiments, the triggering further causes the one or more output devices to communicate the non-compliance alert to the user.

In some embodiments, the module is further configured to generate automated or semi-automated assessments, wherein generating further comprises revising existing logic to apply to individual organization-specific tolerances and exposure appetite.

In another aspect, a computerized method for centralized compliance assessment is presented. The method comprising: deploying, via a network of distributed servers, a compliance assessment application, wherein the compliance assessment application is executed, in parallel, on one or more applications, wherein the one or more applications are in an active state; initiating, via the compliance assessment application, one or more retrieval scripts configured to cause the one or more applications to generate one or more digital artifacts; determining that the one or more applications are compliant with one or more regulatory controls based on at least the one or more digital artifacts generated; initiating an execution of a regulatory report script based on at least determining that the one or more applications are compliant with the one or more regulatory controls, wherein the regulatory report script is configured to generate a graphical interface comprising the one or more digital artifacts, the one or more applications, and an indication of compliance of each of the one or more applications.

In some embodiments, the method further comprises: initiating, via a network of distributed servers, an application detection script configured to identify one or more applications that require compliance with one or more regulatory requirements.

In some embodiments, the method further comprises: determining that at least one of the one or more applications is currently not in an active state; transmitting control signals configured to cause the at least one of the one or more applications to be activated, wherein activating further comprises initiating the at least one of the one or more applications to run in the background; and deploying the compliance assessment application, wherein the compliance assessment application is executed, in parallel, on the at least one of the one or more applications in the background, and the one or more applications in an active state.

In yet another aspect, a computer program product for centralized compliance assessment is presented. The computer program product comprising a non-transitory computer-readable medium comprising code causing a first apparatus to: deploy, via a network of distributed servers, a compliance assessment application, wherein the compliance assessment application is executed, in parallel, on one or more applications, wherein the one or more applications are in an active state; initiate, via the compliance assessment application, one or more retrieval scripts configured to cause the one or more applications to generate one or more digital artifacts; determine that the one or more applications are compliant with one or more regulatory controls based on at least the one or more digital artifacts generated; and initiate an execution of a regulatory report script based on at least determining that the one or more applications are compliant with the one or more regulatory controls, wherein the regulatory report script is configured to generate a graphical interface comprising the one or more digital artifacts, the one or more applications, and an indication of compliance of each of the one or more applications.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. The term "group" as presented herein may refer to one or more lines of business, groups, subsidiaries, business partners, or the like that are associated with an entity that has financial regulatory reporting.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Financial services and products comprise one of the most regulated sectors in the current economy. Any new financial service or product must comply with a plurality of regulatory regimes. As in other markets, technology companies have entered the financial services space and brought with them new and innovative ways to make payments, lend money, lower costs and increase choices for consumers and businesses. As part of these regulations, entities must demonstrate compliance by creating policies and standards, and also build controls that will inspect and provide a level of detail indicating a compliance level. Compliance is the process by which an organization ensures that relevant external and internal requirements such as legislation, rules, guidelines, standards, codes, policies, procedures and controls are complied with. The compliance function assists the business in complying as well as gaining assurance from the business that they have complied. As used herein, "regulatory requirements" may refer to governmental requirements (e.g., laws, rules, regulations, or the like), industry standards (e.g., Payment Card Industry), and/or internal policies/standards/procedures.

Unlike in other markets, however, innovators in financial services must devote significant time and resources for regulatory compliance that can affect investment and innovation, or slow time to market—ultimately affecting consumers and businesses that benefit from easier access and more affordable services. Regulation impacts every aspect of the online lending process, from customer acquisition and disclosures to data security, underwriting and debt collection.

Today, many entities conduct the process of compliance manually, using suboptimal tools, often a combination of paper, email and general purpose technology. This results in an inefficient and elongated cycle that requires representatives to undertake a separate process to confirm that the profile and compliance information held by each regulatory authority is accurate. This confirmation process often requires the entity to identify regulatory authorities which apply to each application in the technology environment and assess them individually using a questionnaire. Each questionnaire has a defined set of questions, and are driven via emails, internal meetings, and in some instances, support from third party service providers. Each application manager or subject matter expert (SME) is required to provide an answer in response to the questionnaire, and in some instances, evidence. These answers and evidence are then assessed to determine whether each application meets the requirements of the regulatory authorities, policy owner, or internal/external industry standard owner. In instances where multiple regulatory authorities, policy owners, or internal/external industry standard owners require same or similar answers and/or evidence for same or similar questions, the current method of compliance assessment can be redundant and inefficient. The present invention aims to design and build an enterprise-wide assessment tool that enables centralized management, tracking and automation of application assessment programs, and incorporates remediation tracking and repository for structured and unstructured data.

Figure 1:
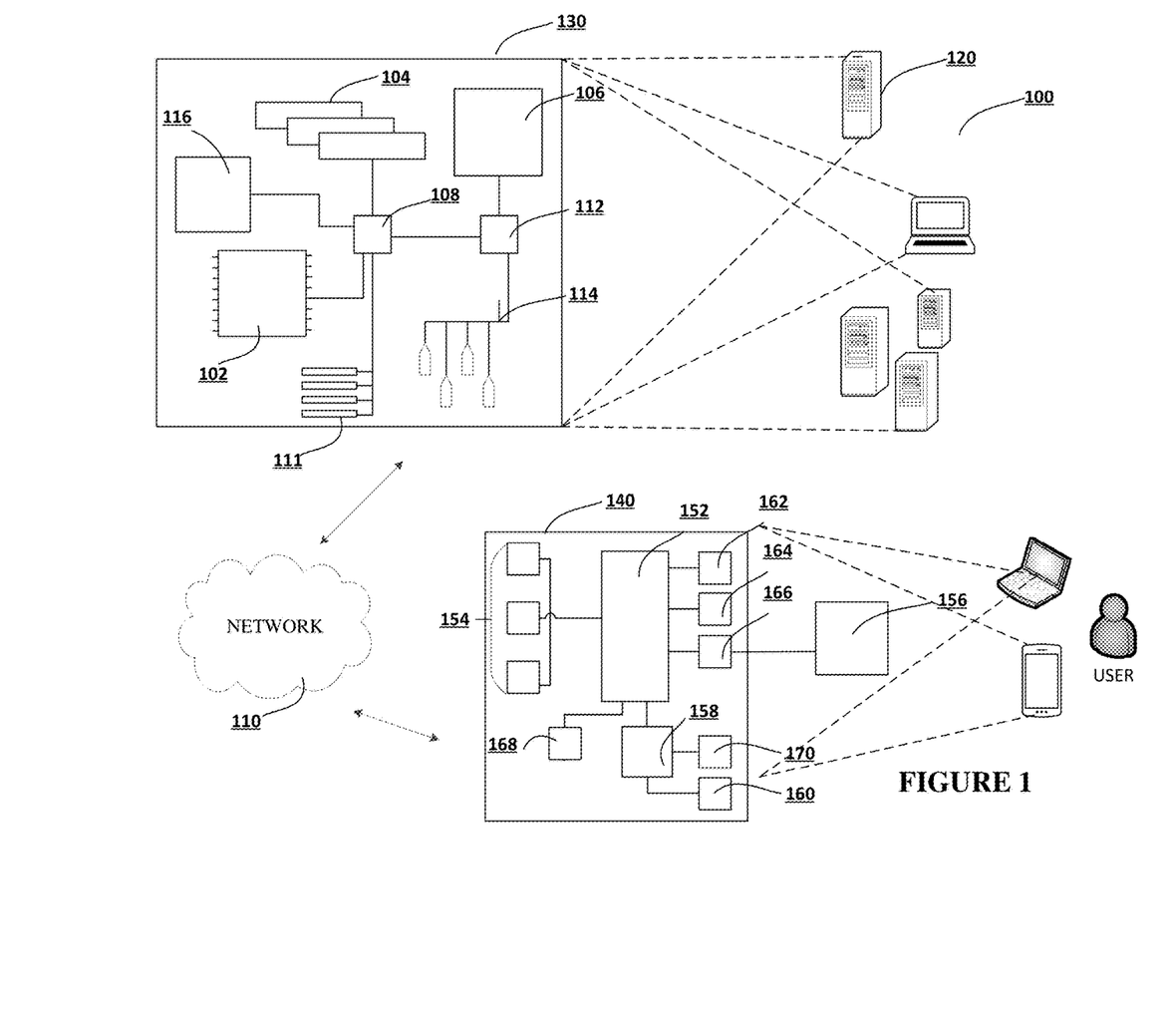
FIG. 1 presents an exemplary block diagram of the system environment for a centralized compliance assessment tool, in accordance with an embodiment of the invention.

FIG. 1 presents an exemplary block diagram of the system environment for a centralized compliance assessment tool, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, load balancers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, multiple times in a group of such servers, or a network of distributed servers. In some embodiments, these servers are arranged in a high-availability cluster configuration to support applications that can be reliably used with a minimum amount of downtime. In one aspect, the configuration may be an active-active high availability cluster. An active-active cluster is typically made up of at least two nodes, both actively running the same kind of service simultaneously. The main purpose of an active-active cluster is to achieve load balancing. Load balancing distributes workloads across all nodes in order to prevent any single node from getting overloaded. Because there are more nodes available to serve, there will also be a marked improvement in throughput and response times. In another aspect, the configuration may be an active-passive high availability cluster. Like the active-active configuration, active-passive also consists of at least two nodes. However, as the name "active-passive" implies, not all nodes are going to be active. The passive (a.k.a. failover) server serves as a backup that's ready to take over as soon as the active (a.k.a. primary) server gets disconnected or is unable to serve.

In the case of two nodes, for example, if the first node is already active, the second node must be passive or on standby. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Figure 2:
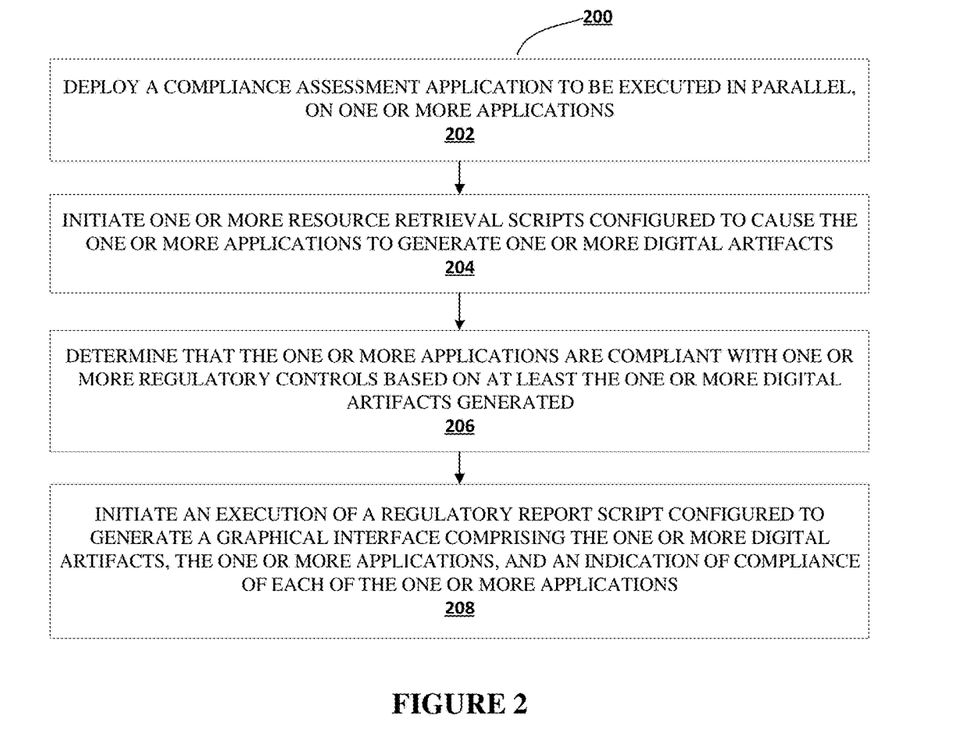
FIG. 2 illustrates a high level flow chart for centralized compliance assessment, in accordance with an embodiment of the invention.

FIG. 2 illustrates a high level flow chart for centralized compliance assessment 200, in accordance with an embodiment of the invention. As shown in block 202, the system may be configured to deploy a compliance assessment application to be executed in parallel, on one or more applications in a technology environment. In one aspect, the system may be configured to run on a centralized technology environment while executing compliance assessment logic in parallel on one or more applications in the technology environment. In some embodiments, the system may be configured to initiate, via a network of distributed servers, an application detection script configured to identify applications that require compliance with regulatory requirements based on data sources and/or systems of records (SSORs) that reside within the network. Once the applications have been determined, the compliance assessment application is then deployed to be executed. The compliance assessment application may also be executed based on user command, whereby automated test metadata define the applications as well as the particular regulatory or internal assessment that will be executed. By executing the compliance assessment application in parallel across multiple applications, the system provides a more efficient and scalable use of system resources with more programmatic control. In some embodiments, the compliance assessment application may also be deployed in any business process and/or technology process within the entity for compliance.

In some embodiments, each application may have control or compliance data stored in authorized data sources (ADSs) and sources/systems of record (SSORs). SSORs/ADSs contain data (evidence) and digital artifacts associated with each application, indicating the application's compliance with standards and policies. In such cases, the system may be configured to retrieve the digital artifacts associated with each application from the SSORs/ADSs for compliance assessment. In other embodiments, the system may be configured to deploy the compliance assessment program on the applications to satisfy a portion of the compliance assessment and retrieve the digital artifacts stored on the SSORs/ADSs for the remaining portion of the assessment.

In some embodiments, the compliance assessment application is deployed via a network of distributed servers to the one or more applications in the technology environment. In one aspect, the applications are in an active state. Typically, an application is considered to be in an active state if the application is currently running on a computing device. In some embodiments, the system may be configured to determine that some of the applications are currently not in an active state. In response, the system may be configured to transmit control signals configured to cause such applications to be activated. In this regard, the control signals may initiate the applications to run in the background and/or override the existing applications running on the computing device and run in an active state. In this way, when the compliance assessment application is deployed, it is executed in parallel, on applications that are active and applications that have been initiated and are running in the background.

Next, as shown in block 204, the system may be configured to initiate one or more retrieval scripts configured to cause the one or more applications to generate one or more digital artifacts. In one aspect, the system may be configured to retrieve, via the centralized assessment application, one or more digital artifacts. For purposes of the invention, "digital artifacts" may refer to any electronic evidence received from the one or more applications. Digital artifacts may come from both structured and unstructured data. Structured data refers to information with a high degree of organization, such that inclusion in a relational database is seamless and readily searchable by simple, straightforward search engine algorithms or other search operations. Unstructured data may have its own internal structure, but does not conform neatly into a spreadsheet or database. While unruly in nature, it may be valuable and increasingly available in the form of complex data sources, such as web logs, multimedia content, email, customer service interactions, sales automation, and large data sets.

In one aspect, the system may be configured to execute the retrieval scripts automatically on at least a portion of each application. In this regard, the retrieval scripts may include one or more program code blocks developed and configured to cause the one or more applications to generate one or more digital artifacts. In another aspect, the generation of digital artifacts may require manual intervention. In this regard, the system may be configured to initiate a graphical interface for display on a computing device associated with a user. In one aspect, the graphical interface may include information associated with the retrieval script being executed on the application and a prompt requesting a manual input from the user. In some embodiments, this manual input is recognized as a digital artifact. In some other embodiments, the manual input triggers the user to upload a digital artifact into the assessment program.

In some embodiments, some applications may be required to contain specific content (e.g., language) in any output produced by each application to ensure compliance with a regulatory requirement. For example, legislative requirement mandates that federal contractors include an equal opportunity (EO) clause in all contracts, subcontracts, and purchase orders. In such cases, the retrieval scripts may be configured to query any output produced by the application to identify the specific EO clause, thereby ensuring the application's compliance with the requirement.

Once generated, these digital artifacts are then stored in the assessment application's repository for future retrieval. The assessment application may store referential data as to the exact data/digital artifact reviewed in the ADSs/SSORs, or data/digital artifact may be duplicated in full or in part in the repository. ADSs and SSORs play a pivotal role in test automation and quality assurance inspection. As described herein, SSORs/ADSs contain data, evidence, and digital artifacts associated with each application, indicating the application's compliance with standards and policies. By integrating with ADSs/SSORs, manual responses can be eliminated, thereby improving accuracy and consistency. In this way, efforts to execute inspections and/or assessments are decreased, and multi-dimensional views of application exposure and control gaps over time can be provided.

As shown in block 206, the system may be configured to determine that the one or more applications are compliant with one or more regulatory controls based on at least the one or more digital artifacts generated. Typically, regulatory controls or control objectives are check-points associated with regulatory requirements. They include the policies and procedures that entities establish to reduce exposure and ensure they meet operating, reporting, and compliance objectives. Further, regulatory controls are designed to ensure entities operate effectively, safeguard assets, produce reliable records, and comply with applicable laws and regulations, and internal or industry standards and policies.

In some embodiments, the system may be configured to determine one or more regulatory controls associated with one or more regulatory requirements. For an application to be compliant with a regulatory requirement, the digital artifacts generated by or retrieved from the application or SSORs/ADSs has to satisfy all the regulatory controls associated with the regulatory requirement. Each regulatory control is associated with one or more digital artifact requirements. Typically, a digital artifact requirement may refer to an amount of evidence required for an application to show compliance with a regulatory control. If the digital artifact requirement matches the generated digital artifact, the regulatory control is considered satisfied. Once each regulatory control associated with the regulatory requirement is satisfied, the application is considered to have satisfied the regulatory requirement. In some embodiments, a single digital artifact may meet one or more digital artifact requirements associated one or more regulatory controls across one or more regulatory requirements.

In some embodiments, the system may be configured to define, create and manage retrieval scripts with the ability to map each retrieval script to one or more regulatory requirements. In this regard, each retrieval script is developed with the intention of causing the applications or SSORs/ADSs to generate digital artifacts that meet the digital artifact requirements of each regulatory control associated with the one or more regulatory requirements. In this regard, the system may be configured to compare a digital artifact requirement associated with a regulatory control, with the digital artifacts generated in response to the execution of the retrieval script. In this way, each retrieval script has a one to many mapping relationship with the regulatory controls and the applications in the technology environment.

In some embodiments, the system may be configured to store the digital artifacts in a volatile memory. In doing so, the digital artifacts may be positioned for faster retrieval. In some embodiments, the system may be configured to restrict access to the digital artifacts stored in the volatile memory until the compliance assessment application has been executed on each of application in the technology environment, and each application has generated the digital artifacts. In response to using the digital artifacts to determine compliance, the system may be configured to move the digital artifacts into a centralized repository where the digital artifacts are stored to maintain historical application responses and evidence.

In response to determining that the applications are compliant with one or more regulatory controls, the system may be configured to initiate an execution of a regulatory report script configured to generate a graphical interface comprising the one or more digital artifacts, the one or more applications, and an indication of compliance of each of the one or more applications, as shown in block 208. In some embodiments, the system may be configured to determine that at least one of the one or more digital artifacts indicates that the one or more applications do not satisfy a required level of compliance to the one or more regulatory requirements. This may be due to one of many reasons. For example, the digital artifact generated may not match the digital artifact requirement of a regulatory control. In another example, the application may have failed to generate the digital artifact. In yet another example, the retrieval script may not have been executed on the application. In response, the system may be configured to initiate an execution of the regulatory report script configured to generate a graphical interface comprising the one or more digital artifacts, the one or more applications, and an indication of non-compliance of each of the one or more applications that do not comply with the one or more regulatory requirements.

In some embodiments, the system may be configured to trigger a non-compliance alert on a computing device associated with a user based on at least the indication of the non-compliance of each of the one or more applications. In one aspect, the non-compliance alert comprises information associated with each of the one or more applications that do not comply with the one or more regulatory requirements and one or more user actions for corrective measure. By triggering the non-compliance alert, the system causes the computing device to transfer control signals to one or more output devices associated with the computing device to enable the output devices to communicate the non-compliance alert to the user. In some embodiments, the output devices may be embedded in the computing devices. In some other embodiments, the output devices may be wirelessly connected to the computing device. In this way, when the system triggers the non-compliance alert, the triggering causes the computing device to establish a wireless communication link with the one or more output devices, thereby causing the one or more output devices to be activated.

In some embodiments, the system may be configured to execute the compliance assessment application on the one or more applications at one or more periodic intervals to determine whether the one or more applications continue to meet the one or more regulatory requirements. However, the periodic intervals required for each application to meet each regulatory requirement may vary, in that, the digital artifact generated for one application may expire earlier than the digital artifact generated by another application. In such instances, one application may have to periodically generate digital artifacts more often than the other application to show regulatory compliance. Typically, the periodic interval associated with each application may be based on at least a level of exposure associated with the application. The lower the level of exposure, the longer the periodic interval. In this regard, the system may be configured to retrieve a first periodic interval and a second periodic interval from this tool's repository. Here, the first periodic interval is associated with a first application, and the second periodic interval is associated with a second application. The system may then be configured to execute the compliance assessment application on the first application and the second application at a first time instant. The first time instant indicates an initial point associated with a first period of the first periodic interval and a first period of the second periodic interval. As a result, the system may be configured to generate a first version of a first digital artifact associated with the first application and a first version of a second digital artifact associated with the second application. Next, the system may determine that the first periodic interval is shorter than the second periodic interval. In response, the system may be configured to execute the compliance assessment application on the first application and the second application at a second time instant, wherein the second time instant indicates an initial point associated with a second period of the first periodic interval but is a point still within the first period of the second periodic interval. In doing so, the system may be configured to generate a second version of the first digital artifact associated with the first application and retrieve the first version of the second digital artifact associated with the second application from the centralized repository. In this way, the system may be configured to avoid duplicative compliance testing.

In some embodiments, a subset of the one or more retrieval scripts configured to be executed on an application may be associated with a periodic interval that is different from the rest of the retrieval scripts configured to be executed on the same application. To this extent, the subset of the retrieval scripts may require execution less often than the rest of the retrieval scripts. In such instances, the system may be configured to use an existing digital artifact generated based on the execution of the subset of retrieval scripts that are within the expiry time period (not yet expired).

In some embodiments, the system may be configured to recognize a new application being integrated into the technology environment. In doing so, the system may be configured to develop a retrieval script configured to cause the new application to generate a digital artifact. In one aspect, the new application may be required to meet the digital artifact requirement of the existing regulatory controls. In this regard, the system may be configured to develop the retrieval script to cause the new application to generate the digital artifact to satisfy the digital artifact requirement of the existing regulatory controls. In another aspect, the new application may be required to meet the digital artifact requirement of new set of regulatory controls that are not currently mapped to the retrieval script. In such instances, the retrieval script is first mapped to the new set of regulatory controls. In response, the system may be configured to develop the retrieval script to cause the new application to generate the digital artifact to satisfy the digital artifact requirement of the new set of regulatory controls.

Figure 3:
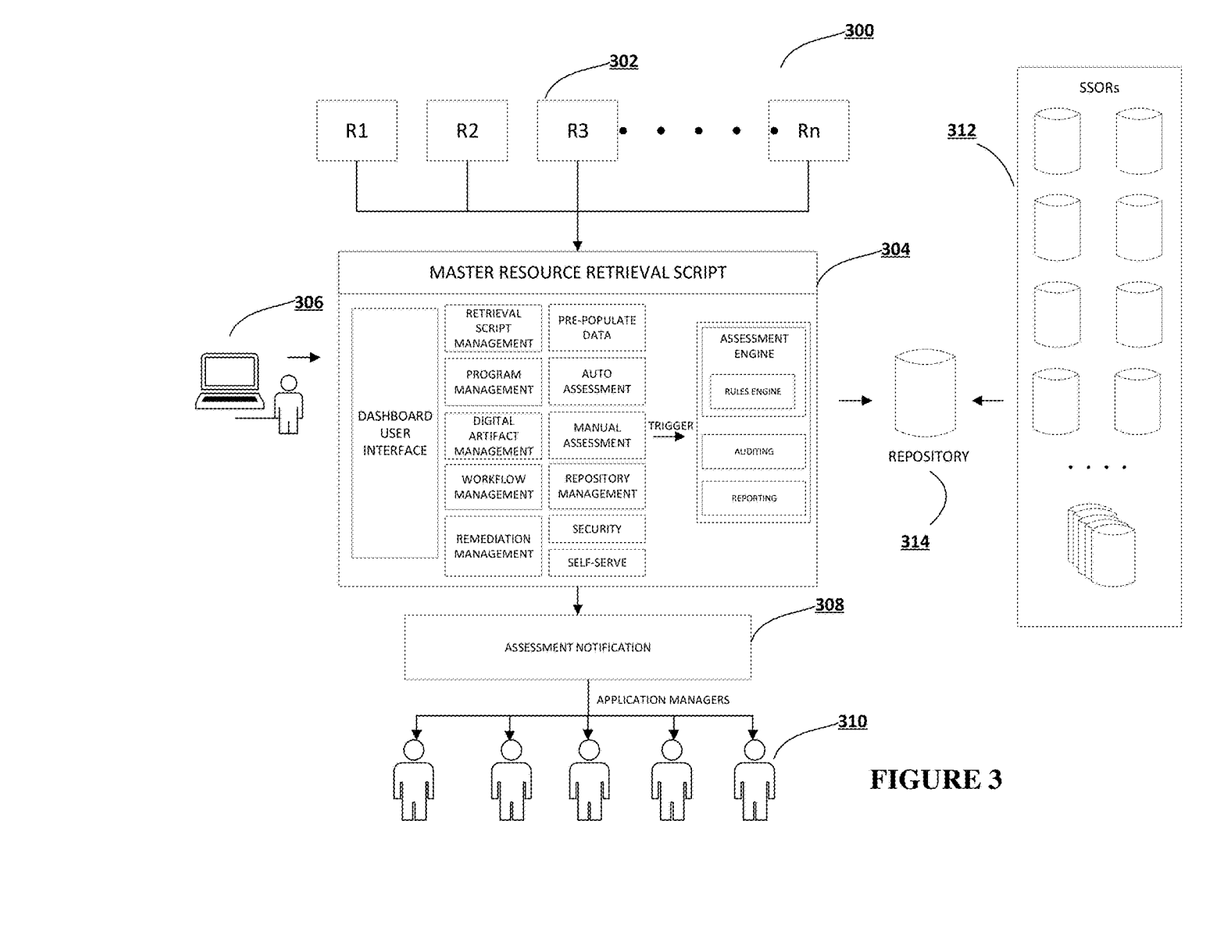
FIG. 3 illustrates a conceptual architecture of the data flow for centralized compliance assessment, in accordance with an embodiment of the invention.

FIG. 3 illustrates a conceptual architecture of the data flow for centralized compliance assessment 300, in accordance with an embodiment of the invention. As shown in FIG. 3, the architecture includes the regulatory requirements 302, master resource retrieval engine 304, assessment notifications 308, a centralized repository 314, and authorized data sources (ADSs) and sources/systems of record (SSORs) 312. In addition, the conceptual architecture includes a user 306 with administrator level access, and one or more application managers/SMEs 310. As shown in FIG. 3, the master retrieval script engine 304 further includes a master retrieval script, a dashboard user interface, retrieval script management module, a program management module, a digital artifact module, a workflow management module, a remediation module, a pre-populate data module, an auto assessment module, a manual assessment module, a repository management module, a security module, repository module, an auditing module, self-serve retrieval script creation, and an assessment engine.

In some embodiments, the retrieval script management module is configured to allow the user 306 to manage (i.e., edit/add/archive/retire) all core data, including but not limited to one or more retrieval scripts and their test metadata, internal control requirements (standards and policies), and associated scope requirements that define one or more applications. The program management module is configured to allow for the planning, kick-off, and monitoring of the execution of the retrieval script requirements. In this regard, the program management module generates retrieval scripts by initiating a subroutine to call the pre-populate data module to pre-populate the digital artifacts with associated compliance status/state previously input by application managers and/or SMEs or in response to the execution of retrieval scripts where current date is not past expiration time period ("ask once, answer many" functionality). In addition, the program management module is configured to identify retrieval scripts and/or applications whose corresponding digital artifacts require manual intervention. Once the digital artifacts have been generated, the program management module stores the digital artifacts in the centralized repository. In one aspect, the program management module is configured to track the execution of each retrieval script on each application and generate a notification every time a digital artifact is generated.

In some embodiments, the digital artifact management module is configured to allow retrieval of the digital artifacts generated in response to the execution of the retrieval scripts for quality assurance inspection. In addition, the digital artifact management module allows overrides, while requiring and retaining an audit trail of review, and assessment. In some embodiments, the workflow management module is configured to allow oversight of workflows necessary to manage the overall system, i.e., review and opt in/out of new and revised retrieval scripts, manage retrieval scripts missing test metadata, import and manage internal control requirements, review and approve repository structure change requests, and manage removal notices.

In some embodiments, the remediation management module is configured to track and identify control gaps in each application's compliance at the regulatory control level. In addition, the remediation management module is configured to maintain tracking number/key from other applications and/or systems where reporting is required. In some embodiments, the auto assessment module is configured to execute retrieval scripts that are configured to be automated and/or semi-automated based on at least the corresponding test metadata. Further, the auto assessment module is configured to locate the digital artifacts in the ADS and/or SSORs, assess the digital artifact against the digital artifact requirements, capture sufficient evidence to provide an audit trail, and determine a compliance status of each application against the regulatory requirements.

In some embodiments, the system may be configured to enable the user to generate a report, in real-time, based on the digital artifacts stored in the ADS and/or SSORs. Although reports may be requested and received by the user, it should be appreciated that the reports may be generated automatically either periodically, or after the occurrence of a particular event. In some embodiments, the reports are generated on an ad-hoc basis by queries submitted by the user. In one aspect, these queries allow the user to generate customized detailed reports on aspects related to compliance assessment results for each application. In some embodiments, the report may be presented for display on the user computing device in the form of a data visualization tool such as an interactive dashboard interface.

In some embodiments, the manual assessment module is configured to allow application managers/SMEs to upload digital artifacts for one or more applications where it is not possible for that were generated in response to retrieval scripts to be developed, or in cases where the retrieval scripts have not yet been developed. In some embodiments, the repository management module is configured to manage the unstructured data. In some embodiments, security module is configured to manage the access levels of authorized users. In some embodiments, the self-serve retrieval script creation module reduces cycle time to revise existing or create new automated and semi-automated tests where Technology/Development Team's assistance is not needed (e.g., revise existing test criteria/rules' logic to apply to individual organization-specific tolerances and exposure appetite, create new automated and semi-automated testing where the SSOR/ADS required data is already registered.

In one aspect, each user may be authorized to access the one or more modules via the dashboard user interface, the digital artifacts from retrieval scripts or unstructured data repository, the retrieval scripts, or the like, based on a continuum of authentication. In some embodiments, the continuum of authentication includes hard authentication, which includes providing access to an application using full authentication credentials. This means that it requires the strictest combination of credentials. In some other embodiments, the continuum of authentication includes a soft authentication that requires minimal credentials, moderate credentials or most credentials for various points along the continuum. The continuum generally represents the number of credentials required and/or the relative strength of the credentials required for that point on the continuum.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for centralized compliance assessment, the system comprising:
   at least one non-transitory memory device with computer-readable code stored thereon;
   at least one processing device; and
   at least one module stored in said memory device and comprising instruction code that is executable by the at least one processing device and configured to cause said at least one processing device to:
   deploy, via a network of distributed servers, a compliance assessment application, wherein the compliance assessment application is executed, in parallel, on one or more applications;
   determine that at least one of the one or more applications is currently not in an active state;
   transmit control signals configured to cause the at least one of the one or more applications to be activated, wherein activating further comprises initiating the at least one of the one or more applications to run in the background;
   deploy the compliance assessment application, wherein the compliance assessment application is executed, in parallel, on the at least one of the one or more applications in the background, and the one or more applications in an active state;
   initiate, via the compliance assessment application, one or more retrieval scripts configured to cause the one or more applications to generate one or more digital artifacts;
   store the one or more digital artifacts generated in response to the one or more retrieval scripts in a volatile memory associated with the at least one memory device;
   retrieve the one or more digital artifacts from the volatile memory to determine whether the one or more digital artifacts satisfy the one or more regulatory controls, wherein determining further comprises comparing a digital artifact requirement associated with each of the one or more regulatory controls with the one or more digital artifacts retrieved;
   restrict access to the one or more digital artifacts stored in the volatile memory until the compliance assessment application has been executed on each of the one or more applications, and each of the one or more applications have generated the one or more digital artifacts;
   determine that the one or more applications are compliant with one or more regulatory controls based on at least the one or more digital artifacts generated; and
   initiate an execution of a regulatory report script based on at least determining that the one or more applications are compliant with the one or more regulatory controls, wherein the regulatory report script is configured to generate a graphical interface comprising the one or more digital artifacts, the one or more applications, and an indication of compliance of each of the one or more applications.

2. The system of claim 1, wherein the module is further configured to:

initiate, via a network of distributed servers, an application detection script configured to identify one or more applications that require compliance with one or more regulatory requirements.

3. The system of claim 1, wherein the module is further configured to:
  determine one or more regulatory controls associated with one or more regulatory requirements, wherein the one or more regulatory controls indicate a level of compliance of the one or more applications to the one or more regulatory requirements; and
  map the one or more retrieval scripts to the one or more regulatory controls, wherein mapping further comprises mapping the one or more digital artifacts generated in response to the one or more retrieval scripts with the one or more regulatory controls.

4. The system of claim 3, wherein the module is further configured to:
  receive the one or more digital artifacts generated in response to initiating the one or more retrieval scripts;
  determine that the one or more digital artifacts satisfy the one or more regulatory controls based on at least mapping the one or more digital artifacts generated in response to the one or more retrieval scripts with the one or more regulatory controls;
  determine that the one or more applications are compliant with the one or more regulatory requirements based on at least the one or more digital artifacts satisfying the one or more regulatory controls.

5. The system of claim 1, wherein the module is further configured to:
  execute the compliance assessment application on the one or more applications at one or more periodic intervals to determine whether the one or more applications continue to meet one or more regulatory requirements.

6. The system of claim 5, wherein the module is further configured to:
  retrieve a first periodic interval and a second periodic interval from an assessment engine, wherein the first periodic interval is associated with a first application, and the second periodic interval is associated with a second application;
  execute the compliance assessment application on the first application and the second application at a first time instant, wherein the first time instant indicates an initial point associated with a first period of the first periodic interval and a first period of the second periodic interval;
  generate a first version of a first digital artifact associated with the first application and a second version of a second digital artifact associated with the second application;
  determine that the first periodic interval is shorter than the second periodic interval;
  execute the compliance assessment application on the first application and the second application at a second time instant, wherein the second time instant indicates an initial point associated with a second period of the first periodic interval but is a point still within the first period of the second periodic interval; and
  generate a second version of the first digital artifact associated with the first application and retrieve the first version of the second digital artifact associated with the second application.

7. The system of claim 1, wherein the module is further configured to initiate the one or more retrieval scripts, wherein initiating further comprises executing one or more functions of the one or more applications for a predetermined period of time.

8. The system of claim 7, wherein the module is further configured to generate one or more digital artifacts in response to the executing of the one or more functions of the one or more applications.

9. The system of claim 1, wherein the module is further configured to:
  determine that at least one of the one or more digital artifacts indicates that the one or more applications do not satisfy a required level of compliance to one or more regulatory requirements; and
  initiate an execution of the regulatory report script based on at least determining that the one or more applications do not comply with the one or more regulatory requirement, wherein the regulatory report script is configured to generate a graphical interface comprising the one or more digital artifacts, the one or more applications, and an indication of non-compliance of each of the one or more applications that do not comply with the one or more regulatory requirements.

10. The system of claim 9, wherein the module is further configured to trigger a non-compliance alert on a computing device associated with a user based on at least the indication of the non-compliance of each of the one or more applications, wherein the non-compliance alert comprises information associated with each of the one or more applications that do not comply with the one or more regulatory requirements and one or more user actions for corrective measure, wherein the triggering is configured to cause the computing device to transfer control signals to one or more output devices associated with the computing device.

11. The system of claim 10, wherein the one or more output devices are embedded in the computing device.

12. The system of claim 10, wherein the one or more output devices are wirelessly connected to the computing device, wherein the triggering of the non-compliance alert causes the computing device to establish a wireless communication link with the one or more output devices, thereby causing the one or more output devices to be activated.

13. The system of claim 10, wherein the triggering further causes the one or more output devices to communicate the non-compliance alert to the user.

14. The system of claim 1, wherein the module is further configured to generate automated or semi-automated assessments, wherein generating further comprises revising existing logic to apply to individual organization-specific tolerances and exposure appetite.

15. A computerized method for centralized compliance assessment, the method comprising:
  deploy, via a network of distributed servers, a compliance assessment application, wherein the compliance assessment application is executed, in parallel, on one or more applications;
  determine that at least one of the one or more applications is currently not in an active state;
  transmit control signals configured to cause the at least one of the one or more applications to be activated, wherein activating further comprises initiating the at least one of the one or more applications to run in the background;
  deploy the compliance assessment application, wherein the compliance assessment application is executed, in parallel, on the at least one of the one or more applications in the background, and the one or more applications in an active state;

initiate, via the compliance assessment application, one or more retrieval scripts configured to cause the one or more applications to generate one or more digital artifacts;

store the one or more digital artifacts generated in response to the one or more retrieval scripts in a volatile memory associated with the at least one memory device;

retrieve the one or more digital artifacts from the volatile memory to determine whether the one or more digital artifacts satisfy the one or more regulatory controls, wherein determining further comprises comparing a digital artifact requirement associated with each of the one or more regulatory controls with the one or more digital artifacts retrieved;

restrict access to the one or more digital artifacts stored in the volatile memory until the compliance assessment application has been executed on each of the one or more applications, and each of the one or more applications have generated the one or more digital artifacts;

determine that the one or more applications are compliant with one or more regulatory controls based on at least the one or more digital artifacts generated; and initiate an execution of a regulatory report script based on at least determining that the one or more applications are compliant with the one or more regulatory controls, wherein the regulatory report script is configured to generate a graphical interface comprising the one or more digital artifacts, the one or more applications, and an indication of compliance of each of the one or more applications.

16. The computerized method of claim 15, further comprises initiating, via a network of distributed servers, an application detection script configured to identify one or more applications that require compliance with one or more regulatory requirements.

17. A computer program product for centralized compliance assessment, the computer program product comprising a non-transitory computer-readable medium comprising code causing a first apparatus to:

deploy, via a network of distributed servers, a compliance assessment application, wherein the compliance assessment application is executed, in parallel, on one or more applications;

determine that at least one of the one or more applications is currently not in an active state;

transmit control signals configured to cause the at least one of the one or more applications to be activated, wherein activating further comprises initiating the at least one of the one or more applications to run in the background;

deploy the compliance assessment application, wherein the compliance assessment application is executed, in parallel, on the at least one of the one or more applications in the background, and the one or more applications in an active state;

initiate, via the compliance assessment application, one or more retrieval scripts configured to cause the one or more applications to generate one or more digital artifacts;

store the one or more digital artifacts generated in response to the one or more retrieval scripts in a volatile memory associated with the at least one memory device;

retrieve the one or more digital artifacts from the volatile memory to determine whether the one or more digital artifacts satisfy the one or more regulatory controls, wherein determining further comprises comparing a digital artifact requirement associated with each of the one or more regulatory controls with the one or more digital artifacts retrieved;

restrict access to the one or more digital artifacts stored in the volatile memory until the compliance assessment application has been executed on each of the one or more applications, and each of the one or more applications have generated the one or more digital artifacts;

determine that the one or more applications are compliant with one or more regulatory controls based on at least the one or more digital artifacts generated; and initiate an execution of a regulatory report script based on at least determining that the one or more applications are compliant with the one or more regulatory controls, wherein the regulatory report script is configured to generate a graphical interface comprising the one or more digital artifacts, the one or more applications, and an indication of compliance of each of the one or more applications.

18. The computer program product of claim 17, wherein the first apparatus is further configured to:
initiate, via a network of distributed servers, an application detection script configured to identify one or more applications that require compliance with one or more regulatory requirements.

19. The computer program product of claim 17, wherein the first apparatus is further configured to:
determine one or more regulatory controls associated with one or more regulatory requirements, wherein the one or more regulatory controls indicate a level of compliance of the one or more applications to the one or more regulatory requirements; and
map the one or more retrieval scripts to the one or more regulatory controls, wherein mapping further comprises mapping the one or more digital artifacts generated in response to the one or more retrieval scripts with the one or more regulatory controls.

20. The computer program product of claim 19, wherein the first apparatus is further configured to:
receive the one or more digital artifacts generated in response to initiating the one or more retrieval scripts;
determine that the one or more digital artifacts satisfy the one or more regulatory controls based on at least mapping the one or more digital artifacts generated in response to the one or more retrieval scripts with the one or more regulatory controls;
determine that the one or more applications are compliant with the one or more regulatory requirements based on at least the one or more digital artifacts satisfying the one or more regulatory controls.

* * * * *